United States Patent [19]

Kamimura et al.

[11] Patent Number: 5,170,350
[45] Date of Patent: Dec. 8, 1992

[54] STEERING CONTROL SYSTEM FOR MOVING VEHICLE

[75] Inventors: Kenji Kamimura; Sadachika Tsuzuki; Toru Takeda; Toshikazu Nakamura, all of Saitama, Japan

[73] Assignee: Honda Giken Kogyo Kabushiki Kaisha, Tokyo, Japan

[21] Appl. No.: 708,200

[22] Filed: May 31, 1991

[30] Foreign Application Priority Data

Jun. 27, 1990 [JP] Japan .................. 2-169599

[51] Int. Cl.$^5$ .......................................... G06F 15/50
[52] U.S. Cl. ..................... 364/424.02; 318/587; 180/169
[58] Field of Search ........... 364/443, 444, 449, 424.02; 180/167, 168, 169; 318/587

[56] References Cited

U.S. PATENT DOCUMENTS

| | | | |
|---|---|---|---|
| 4,309,758 | 1/1982 | Halsall et al. | 364/424.02 |
| 4,626,995 | 12/1986 | Lofgren et al. | 364/449 |
| 4,700,301 | 10/1987 | Dyke | 364/424.02 |
| 4,796,198 | 1/1989 | Boultinghouse et al. | 364/424.02 |
| 4,858,132 | 8/1989 | Holmquist | 364/424.02 |
| 4,947,324 | 8/1990 | Kamimura et al. | 364/424.02 |
| 5,005,128 | 4/1991 | Robins et al. | 364/424.02 |
| 5,014,204 | 5/1991 | Kamimura et al. | 180/167 |
| 5,031,101 | 7/1991 | Kamimura et al. | 364/424.02 |

Primary Examiner—Gary Chin
Attorney, Agent, or Firm—Pollock, VandeSande and Priddy

[57] ABSTRACT

A steering control system wherein a light receiving means rotating integrally with a light scanning means is mounted on a moving vehicle, and a light beam is scanned around the moving vehicle in the circumferential direction and the light beams reflected by at least three light reflecting means are sequentially detected by the light receiving means to detect the position of the moving vehicle on the basis of the reflected light beams so as to travel the vehicle along a predetermined traveling course. The reference direction of a photosensor used for the light beam scanning is maintained between predetermined adjoining two light reflecting means and the steering control is performed in dependance upon the positional information of the moving vehicle calculated on the basis of the detected azimuths of the reflected light beams if the number of reflected light beams detected during one revolution of the light beam is equal to the number of the disposed light reflecting means.

8 Claims, 8 Drawing Sheets

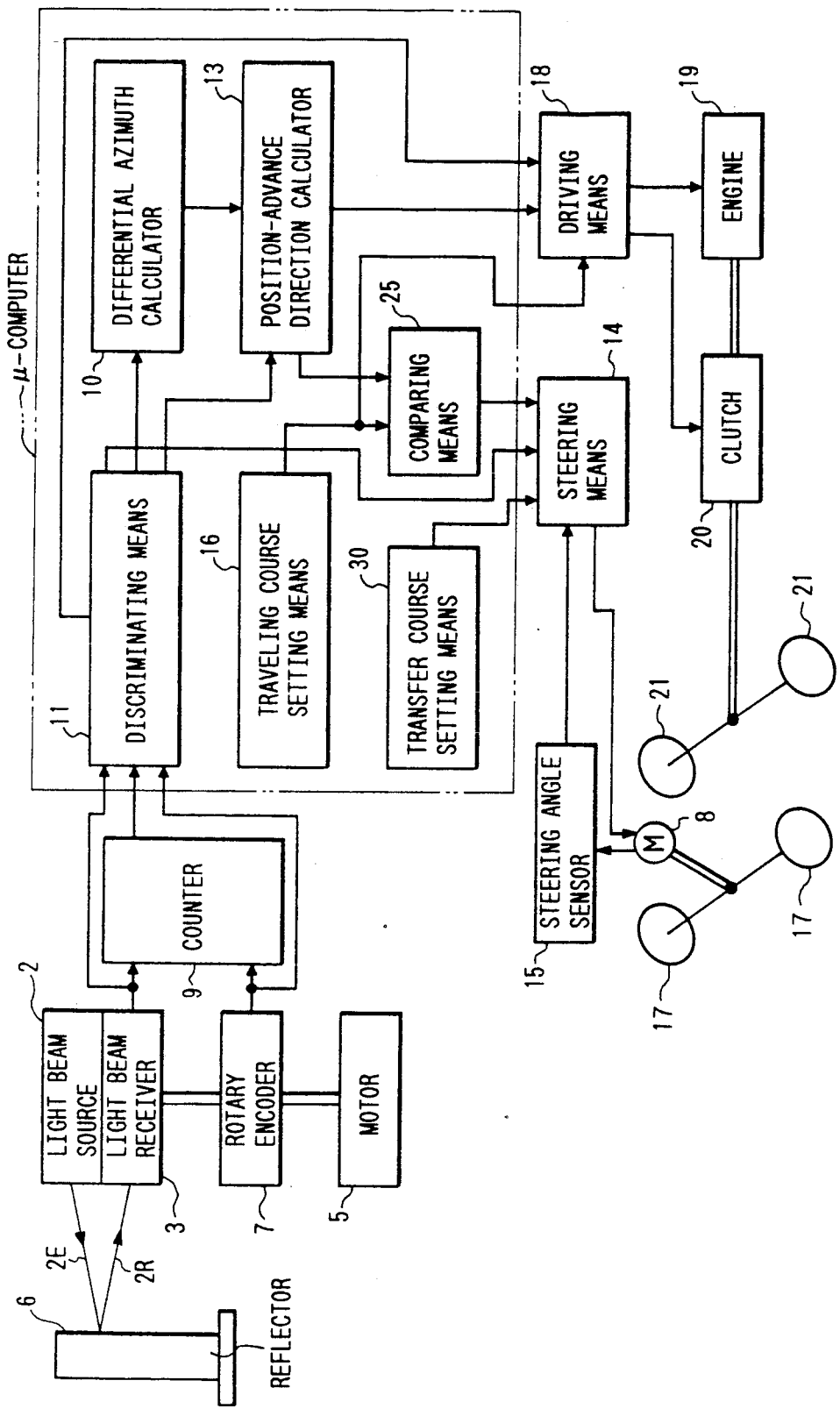

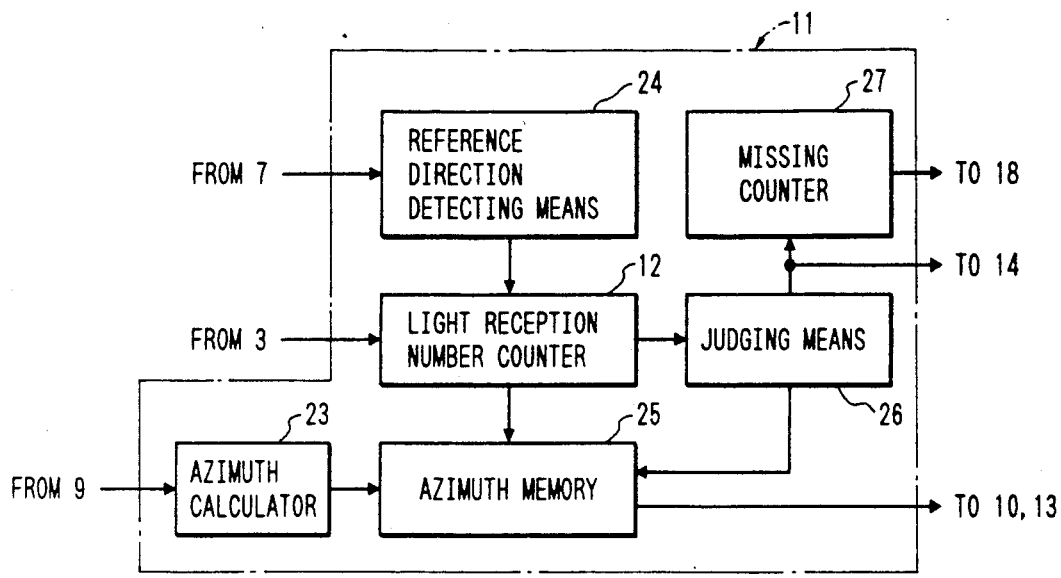
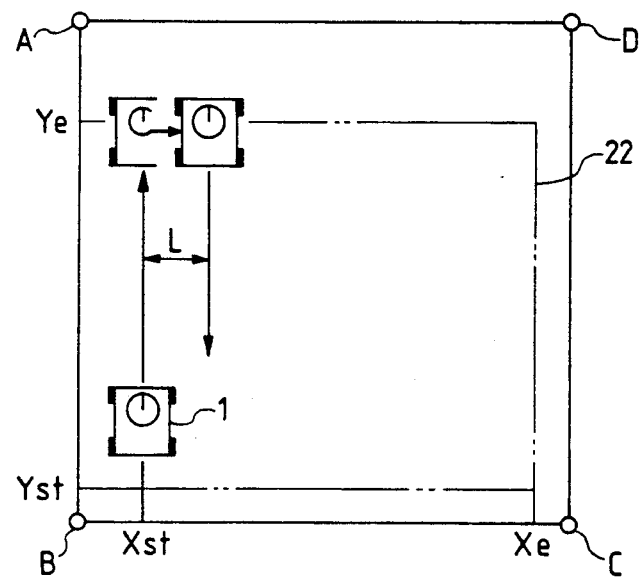

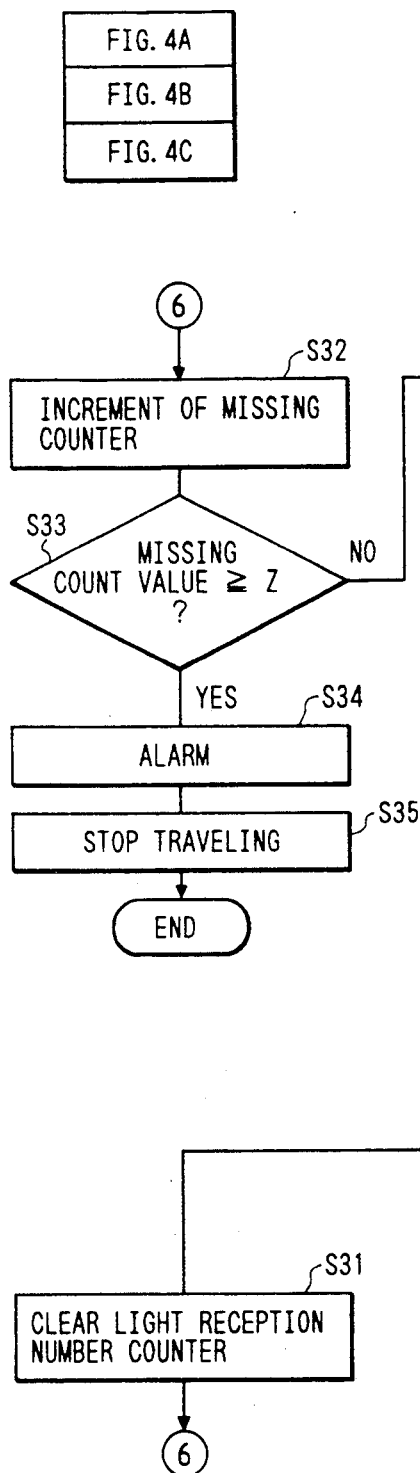
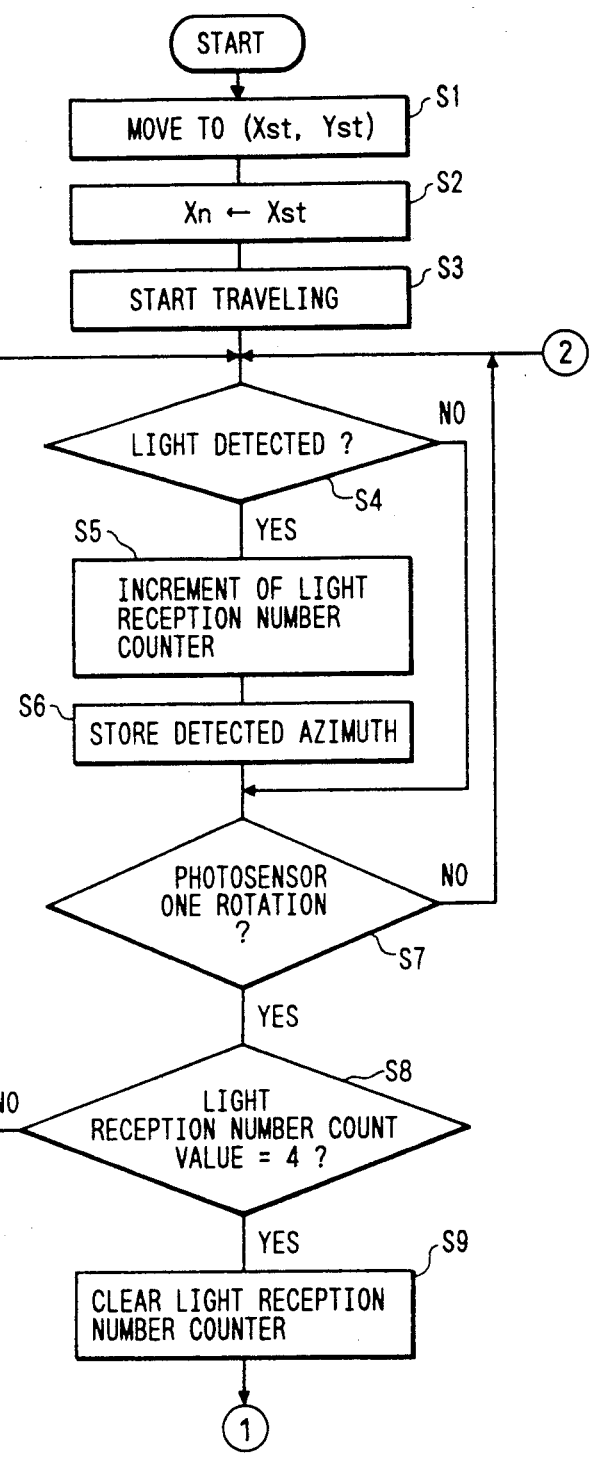
FIG. 4
FIG. 4A

STEERING CONTROL SYSTEM FOR MOVING VEHICLE

BACKGROUND OF THE INVENTION

1. Field of the Invention

The present invention relates to a steering control system for use in a moving vehicle, and more particularly to a steering control system for use in a moving vehicle such as a moving automobile, an unmanned mobile and carrying device in a factory, or an automated vehicle for use in agriculture, civil engineering machinery and the like.

2. Description of the Prior Art

Heretofore, as a system for detecting a current position of a moving body such as the moving vehicles as described above, there has been proposed a system provided with a means for scanning a light beam emitted from a moving body in the circumferential direction or every azimuthal direction around the moving body, retroreflective means for reflecting the light beam in the direction of incident light which are secured at at least three reference positions apart from the moving body, and a beam receiver means for receiving light reflected by the retroreflective means (Japanese Patent Laid-open No. 67476/1984).

In the above mentioned prior art, differential azimuths between the adjoining two of three retroreflective means around the moving body, or included angles formed by the adjoining two of three retroreflective means with the moving body, are detected on the basis of the received beam output of the light-receiving means, and the position of the moving body is then calculated based on the detected differential azimuths and positional information of the retroreflective means or reference points which have been previously set.

In the above described system, however, there has been such a case where a light beam emitted from a beam source mounted on the moving vehicle could not be directed to the retroreflective means positioned at reference points because of an inclination or vibration of the moving vehicle, or a case where the light-receiving means on the moving vehicle receives light reflected from objects other than the expected retroreflective means.

When real reflected light is not positively received by a light-receiving means, the position of the moving vehicle is erroneously calculated so that the moving vehicle cannot be traveled along a prescribed course.

As a solution for the above-mentioned difficulties, the present applicant proposed a control system wherein on the basis of the azimuths of a light reflecting means as seen from the moving vehicle which were detected by the current and the last scans, the azimuth at which the same light reflecting means is to be detected in the next scan is predicted and the incident light from the predicted azimuth in the next scan is presumed to be the correct reflected light from the expected reflecting means (U.S. patent application Ser. No. 420,063, now U.S. Pat. No. 5,031,101 issued Jul. 9, 1991).

In the above control system, if no light signal is detected at the predicted azimuth, the predicted azimuth can be used for calculating the self-position of the moving vehicle as the azimuth at which the reflected light from the predetermined light reflecting means is detected, thereby to solve the problem due to a temporary missing of a light reflecting means, but the system for discriminating reference points or light reflecting means is easily complicated because it is required, for instance, to compare the detected azimuth and predicted azimuth of the light reflecting means for discriminating which light reflecting means the reflected light is coming from.

SUMMARY OF THE INVENTION

It is the object of the present invention to provide a steering control system for a moving vehicle wherein a traveling pattern is decided so that the reference direction of the photosensor mounted on the moving vehicle is maintained within a predetermined direction range of the work area, thereby to simplify the discrimination process of reference points.

The present invention is a steering control system wherein a photosensor comprising a light beam scanning means and a light receiving means rotating integrally with the scanning means is mounted on a moving vehicle, and a light beam is scanned around the moving vehicle in the circumferential direction and the light beam reflected by at least three light reflecting means disposed at separate positions remote from the moving vehicle are sequentially detected by the light receiving means to detect the position of the moving vehicle on the basis of the detected signal, whereby the moving vehicle is made to travel along a predetermined traveling course on the basis of the positional information, characterized by maintaining the reference direction of the photosensor for the light beam scanning between predetermined adjoining two light reflecting means, and by performing the steering control by the positional information of the moving vehicle calculated on the basis of the detected azimuth of the light signal if the number of light signals detected during one revolution (360° scan) of the light beam is equal to that of the disposed light reflecting means.

Since the reference direction of the photosensor is kept between predetermined adjoining two light reflecting means in the present invention, only by comparing the number of the disposed light reflecting means with that of the light signals detected during one revolution or scan of the light beam, it can be judged on the basis of the comparative result whether all of the light reflecting means have been normally detected or some of them have been missed.

BRIEF DESCRIPTION OF THE DRAWING

FIGS. 1 and 2 are functional block diagrams showing an embodiment of the present invention;

FIG. 4 constituting FIGS. 4A–4C is a flowchart of steering control;

FIG. 5 is a representation showing another example of the traveling course of the moving vehicle;

DETAILED DESCRIPTION OF THE PREFERRED EMBODIMENTS

Figure 6:
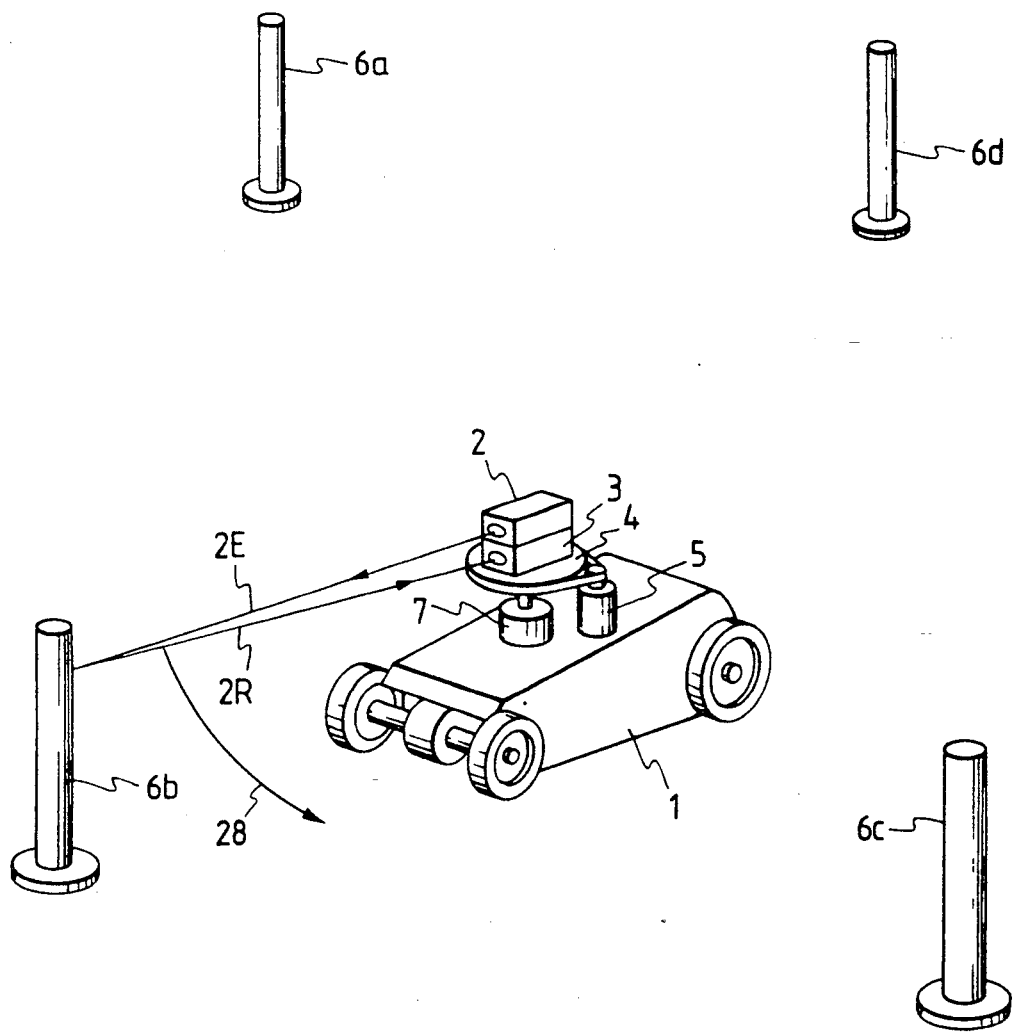
FIG. 6 is a perspective view showing the arrangement of the moving vehicle and the reflectors.

An embodiment of the present invention will be described hereinbelow by referring to the accompanying drawings. FIG. 6 is a perspective view showing a state of arrangement in respect of a moving vehicle carrying the control system according to the present invention and each of light reflectors disposed in an area in which the moving vehicle travels.

In FIG. 6, the moving vehicle 1 is one for use in agricultural working such as a lawn mower and the like. A rotating table 4 driven by a motor 5 is mounted on the upper part of the moving vehicle 1. The rotating table 4 mounts a beam source 2 for emitting light beam 2E and a beam receiver 3 for receiving light 2R reflected by each of the retroreflectors 6a–6d for reflecting the light beam 2E. The beam source 2 is provided with a light beam emitting means (light-emitting diode) and the beam receiver 3 is provided with a means (photo-diode) for receiving incident light to convert it into an electrical signal (both of them are not shown). Furthermore a rotary encoder 7 is disposed so as to be interlocked with a drive shaft of the rotating table 4, so that when pulses output from the rotary encoder 7 are counted, a turning angle of the rotating table 4 can be detected. The retroreflectors 6a–6d are located around a working area of the moving vehicle 1.

The light beam 2E generated in the light beam source 2 is scanned, for instance, in the counterclockwise direction 28, the lights 2R reflected by reflectors 6a–6d are detected by the light beam receiver 3 in the order of the reflected lights from reflectors 6a, 6b and 6c, and the self-position of the moving vehicle 1 in regard to reflectors 6a–6c are detected on the basis of the detected signals to perform steering control for the vehicle 1.

A fundamental principle for detecting the position and the advance direction of the moving vehicle 1 will be described hereinbelow in accordance with the present embodiment having the above described construction.

Figure 8:
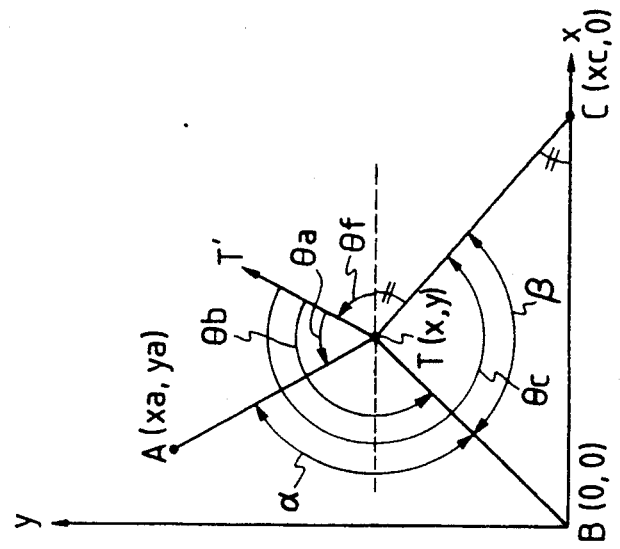
FIG. 8 is a diagram showing a principle of detecting the advance direction of the moving vehicle.
Figure 7:
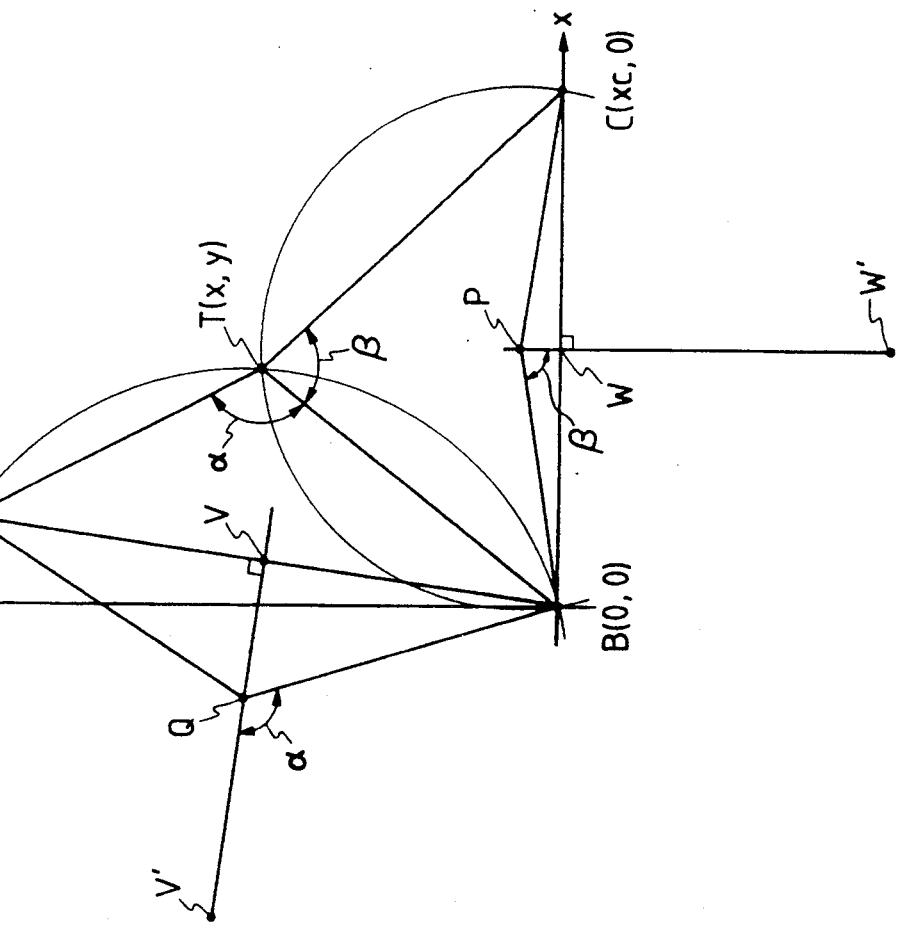
FIG. 7 is a principle diagram of the position detection of the moving vehicle.

FIGS. 7 and 8 are explanatory graphical representations each showing the position T of the moving vehicle 1 and those of the reflectors 6 (6a–6c) in a coordinate system for indicating the working area of the moving vehicle 1.

In these figures, positions of the reflectors 6a–6c are indicated by points A, B and C (hereinafter referred to as "reference points A, B and C"). The positions of the reference points and the vehicle 1 are represented by an x-y coordinate system wherein the reference point B is the origin, and a line extending between the reference points B and C is the x-axis. The current position of the moving vehicle 1 is T(x, y) and the advance direction with respect to the x-axis is $\theta f$. As is apparent from FIG. 7, the position T of the moving vehicle is on a first circumscribed circle Q for a triangle ATB as well as a second circumscribed circle P for a triangle BTC. Accordingly, when two points of intersection of the two circumscribed circles Q and P for the triangles ATB and BTC are calculated, the position of the moving vehicle 1 is fixed. In this case, since the reflector 6b is the origin, the other intersection T of the two circumscribed circles P and Q is calculated in accordance with an appropriate procedure so that the position of the moving vehicle 1 is found. The fundamental principle and the calculation equations are fully described in U.S. patent application Ser. Nos. 344,574 (now U.S. Pat. No. 5,011,288) and 362,630 (now U.S. Pat. No. 4,947,324).

Furthermore, the advance direction of the moving vehicle 1 is calculated as follows. In FIG. 8, assuming that an angle between the advance direction TT′ of the moving vehicle 1 and x-axis is $\theta f$, and the differential azimuths of the reference points A, B and C with respect to the advance direction TT′ as reference are, respectively, $\theta a$, $\theta b$ and $\theta c$, it gives the following equation, $$\theta f = 360° - \tan^{-1}\{y/(xc-x)\} - \theta c \tag{1}$$

The position T and the advance direction T′ of the vehicle 1 is calculated in the position-advance direction operation means 13 of FIG. 1.

The discrimination process as to whether or not an expected reference point has been detected is performed as follows in the present invention. If the reference points are set at four places and any reference point is not missed and no noise is received, four light signals should be detected during one rotation or scan of the photosensor. Consequently, it is judged that all the reference points have been detected if the number of the detected light signals are compared with the number of the reference points or "4" for each one rotation of the photosensor and both match. Even if light other than that from the reflector placed at the expected reference point, namely, noise is received and the noise is erroneously recognized as the reflected light from the expected reference point in the discrimination process, the precision of the steering control is not so largely damaged by the temporary noise contamination that hindrance occurs in the practical use if the previously stored data is cleared for each one rotation of the photosensor and the number of the light signals is newly detected and counted.

In the present embodiment, the reference direction of the photosensor for azimuth detection can always be directed between the predetermined two reference points adjoining each other by steering the moving vehicle 1 as described later. As a result, since the order in which the lights reflected by the reflectores at the reference points are detected does not change from the predetermined known order except for the case where some reference points are missed or noise is erroneously recognized as a reference point, it is deemed that no error has occurred in the detection if the numbers of the previously disposed reference points and the received light signals are equal. Then the azimuths of the individual reference points are determined by matching the detected azimuth data with the expected individual reference points according to the detection order thereof.

Now, the construction of the control system according to the present embodiment is described with reference to the functional block diagram shown in FIG. 1 where the portion surrounded with a chain line can be comprised of a microcomputer.

In FIG. 1, light beam 2E generated in a beam source 2 is scanned as shown in FIG. 6 and reflected by reflectors 6 (6a–6d). The reflected light beam 2R is received by a beam receiver 3. In a counter 9, the pulses outputted from rotary encoder 7 as the rotating table 4 rotates are counted. The count value of the pulses is transferred to a discriminating means 11 each time light is detected in the beam receiver 3. To the discriminating means 11, the light signal received in the beam receiver 3 and the pulse signal outputted from the rotary encoder 7 are also directly supplied in addition to the pulse count value of the counter 9.

In the discriminating means 11, the azimuths of reflectors 6a–6d are calculated on the basis of the supplied individual signals, and a discrimination process is performed for judging whether or not there is any reference point missing. The details of the construction and operation of the discriminating means 11 are described later in conjunction with FIG. 2.

The azimuthal data detected in the discriminating means 11 is inputted to a differential azimuth calculating means 10, where the differential azimuths of the individual reflectors 6a-6d as seen from the moving vehicle 1 are calculated. In a position-advance direction calculating means 13, the coordinates of the current position of the moving vehicle 1 is calculated on the basis of the differential azimuths, and the advance direction of the moving vehicle 1 is calculated on the basis of the azimuths. The calculated position (Xp, Yp) and advance direction $\theta f$ are inputted to a comparator means 25.

In comparator means 25 the data representing the traveling course previously set in a traveling course setting means 16 and the calculated current position-advance direction are compared. In a steering means 14, the steering angle of the moving vehicle 1 is determined on the basis of the comparison result in the comparator means 25, that is, on the basis of deviation amount $\Delta x$ in the X-axis and difference angle $\Delta \theta f$, thereby for driving a steering motor 8 connected to front wheels 17 of the moving vehicle 1. The steering amount of the front wheels 17 is detected by a steering angle sensor 15 and fed back to the steering means 14.

A drive control means 18 controls the start and stop of an engine 19 and the operation of a clutch 20 which transmits the power of the engine 19 to rear wheels 21, on the basis of the data supplied from the traveling course setting means 16, the position-advance direction calculating means 13 and the discriminating means 11.

Stored in a transfer course setting means 30 is a transfer course for traveling from one straight traveling course for a work to the next straight traveling course for the work. When the moving vehicle 1 has reached a predetermined position for moving to the transfer course, a steering angle is determined in the steering means 14 according to the instructions issued from the transfer course setting means 30. The output from the comparator means 25 is inhibited while the moving vehicle 1 is traveling idle according to the instructions from the transfer course setting means 30.

The details of the discriminating means 11 is described with reference to the functional block diagram of FIG. 2. In the same figure, the azimuths of the reflectors 6a-6d are calculated in an azimuth calculating means 23 on the basis of the count value supplied by the counter 9. The count value in a light reception number counter 12 is renewed each time a light signal is supplied from the beam receiver 3, and the azimuths calculated in the azimuth calculating means 23 are stored in the azimuth memory means 25 in correspondence to the count value in the light reception number counter 12.

Pulse signals are supplied from the rotary encoder 7 to a reference azimuth detecting means 24, and when the number of the pulse signals has reached a value representing the rotational angle of one rotation or scan of the photosensor, a signal is outputted to the light reception number counter 12 for indicating that the photosensor has made one rotation. This signal can be used as a signal indicating the reference azimuth direction.

The light reception number counter 12 outputs the current count value to a judging means 26 in response to the incoming of the reference azimuth signal. The judging means 26 judges on the basis of the supplied count value whether or not all the reference points have been detected. If the preset number of the reference points coincides with the count value, a matching signal is outputted by the judging means 26, and in response to this signal, the stored data is outputted from the azimuth memory means 25 to the differential azimuth calculating means 10 and position-advance direction calculating means 13.

If the preset number of the reference points does not coincide with the count value, the judging means 26 outputs a mismatching signal which indicates that a reference point has been missed or noises other than the reference points have been detected, fixes the steering angle at the current value and renews the count value of a missing counter 27. If the count value of the counter 27 which gives the number of continuous occurrences of the mismatching signal has exceeded a predetermined number, it is judged that correct steering control cannot be expected, and thus a stop signal for the moving vehicle 1 is outputted from the missing counter 27 to the drive control means 18.

Figure 3:
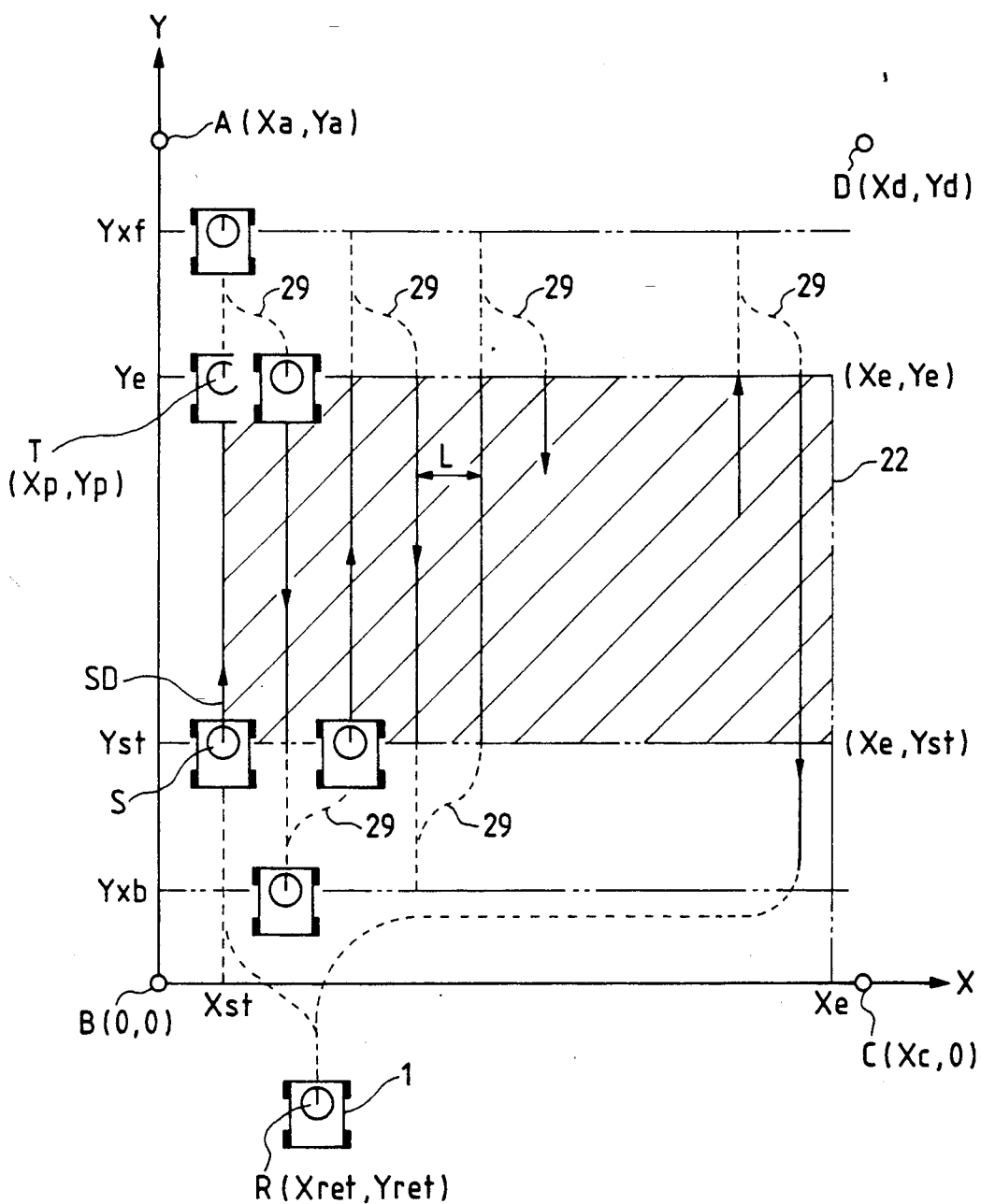
FIG. 3 is a representation showing an example of the traveling course of a moving vehicle.

The steering control of the moving vehicle 1 based on the positional information of the moving vehicle 1 calculated by the above-mentioned procedure is now described. FIG. 3 shows the positional relationships between the traveling course of the moving vehicle 1 and the reference points A-D where the current position of the moving vehicle 1 and the work area 22 by the moving vehicle 1 are shown in an X-Y coordinate system in which reference point B is the origin and a straight line passing through reference points B and C is the X-axis.

A point R(Xret, Yret) represents the return position of the moving vehicle 1 after the completion of the work, and the region enclosed by the lines connecting the four points represented by coordinates (Xst, Yst), (Xst, Ye), (Xe, Yst) and (Xe, Ye) is the work area 22. The current position T of the moving vehicle 1 is designated by coordinates (Xp, Yp).

Moving vehicle 1 starts a work from the start position S(Xst, Yst) and sequentially travels a first straight work course, a transfer course 29 from the first straight work course to an adjoining second straight work course spaced by pitch L, and the second straight work course, thereby performing a predetermined work such as lawn mowing. However, an idle operation performing no work such as lawn moving is provided in the transfer courses 29.

When the Y-coordinate exceeds Ye and reaches Yxf in the forward direction (upward direction on the drawing) or it exceeds Yst and reaches Yxb in the backward direction (downward direction on the drawing), the moving vehicle 1 travels along the predetermined transfer course 29. That is, when the current Y-coordinate of the moving vehicle 1 increases to Yxf or decreases to Yxb, the moving vehicle 1 starts a backward traveling for transfer to the adjoining next straight work course. Thus, while the moving vehicle 1 transfers from one straight work course to the following next straight work course, the direction of the moving vehicle 1 does not change before and after the transfer and only the travel direction reverses, so that the reference direction SD of the photosensor mounted on the moving vehicle 1 does not change. In the present embodiment, the reference direction SD of the photosensor is always maintained between reference points A and D.

Figure 4B:
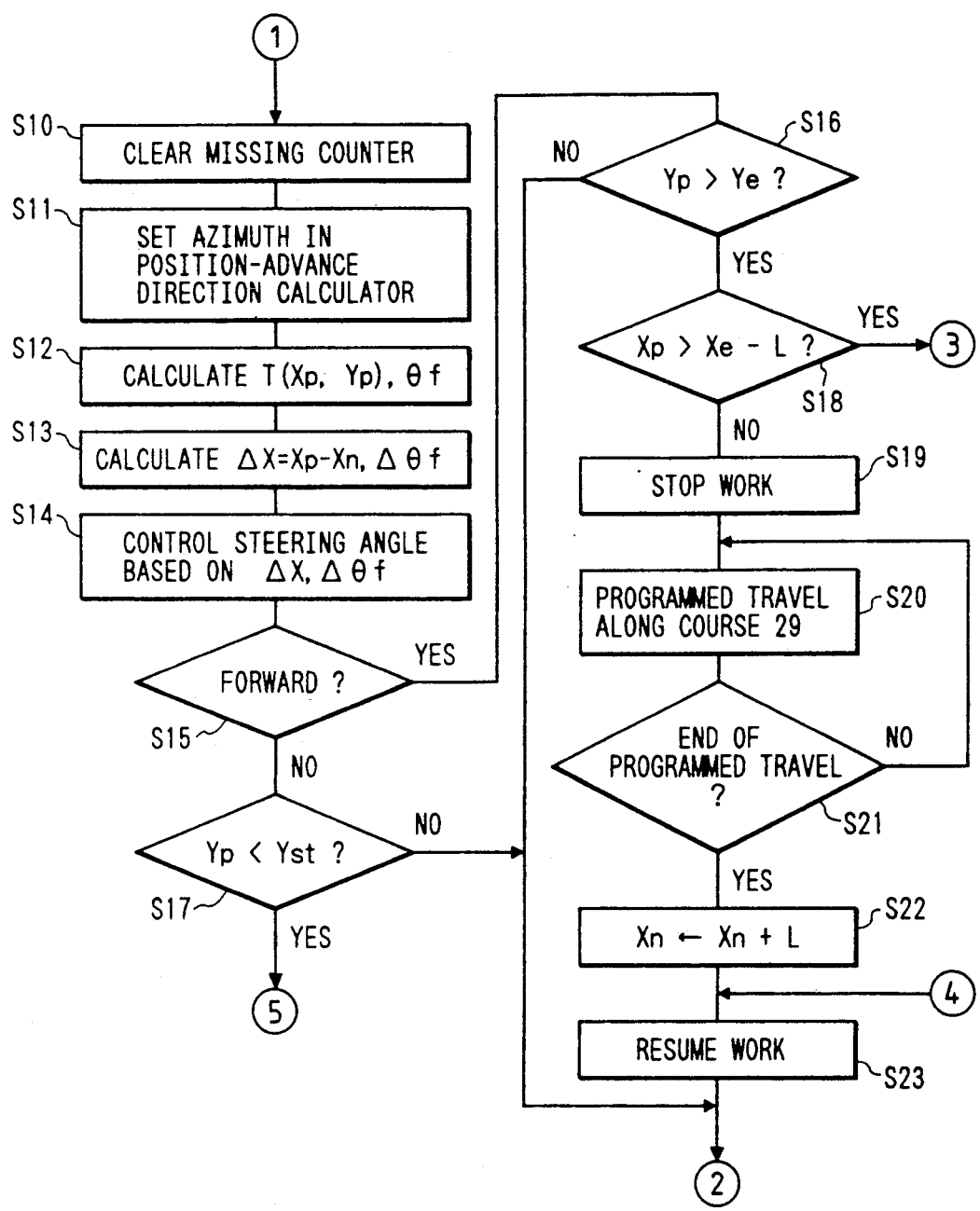
Figure 4C:
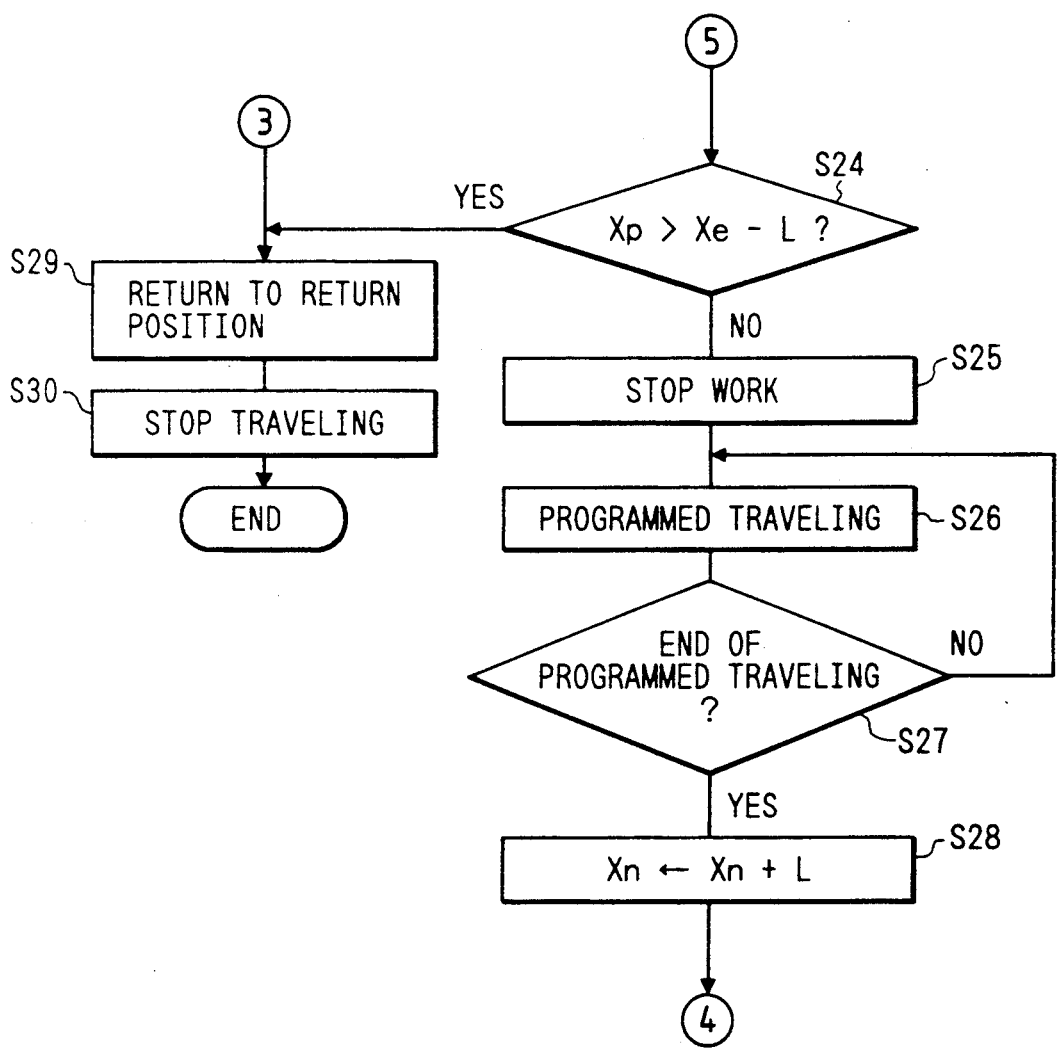

In the transfer course 29, the moving vehicle 1 travels as preprogramed according to the course set in the transfer course setting means 30, as detailed later with reference to FIG. 4, and steering control based on the detected self-position and the positional information of the reference points is not provided.

For simplifying the explanation, while an example wherein four sides of the working area 22 are parallel to the x- or y-axes is shown in FIG. 3, other directions and/or shapes of the working area may be selected so far as the points A–D are disposed around the working area 22.

In accordance with the flowchart shown in FIG. 4, a control procedure will be described hereinbelow in which it is assumed that the moving vehicle 1 reciprocates parallel to the y-axis as in the traveling locus of FIG. 3, and the pitch therefor is L.

First of all, in step S1, the moving vehicle 1 is transferred by means of, for example, radio control from a point R to a position S where working is started.

In step S2, Xst is set as an X-coordinate Xn for a traveling course thereby to fix the traveling course. Traveling of the moving vehicle 1 is started in step S3.

It is judged in step S4 whether or not light which is reflected by any reference point or light from another light source is received by the beam receiver 3. When light is detected, the operation proceeds to step S5, and a count value of the light reception number counter 12 is increased by one.

In step S6, the azimuth of the light detected in the beam receiver 3 is stored in the azimuth memory means 25. The detected azimuth is preferably stored correspondingly to the count value of the light reception number counter 12. If no light is detected in the beam receiver 3, steps S5 and S6 are skipped.

In step S7, it is determined on the basis of the output of the reference direction detecting means 24 whether or not the photosensor has made one rotation. The process returns to step S4 if the photosensor has not made one rotation, but goes to step S8 if it has made.

In step S8, it is determined in the judging means 26 whether or not the count value of the light reception number counter 12 is equal to the preset number of the reference points (in this example, "4"). If the count value is "4", the flow advances to step S9 to clear the count value thereof, and further clears the missing counter 27 in step S10.

In step S11, the azimuthal data stored in the azimuth memory means 25 correspondingly to the count value "1" in the light reception number counter 12 is set in the position-advance direction calculating means 13 as the azimuth of the reference point A, and similarly the azimuthal data stored correspondingly to the count values "2", "3" and "4", respectively, are set as the azimuths of the reference points B, C and D.

The present position (Xp, Yp) and an advance direction $\theta f$ of the moving vehicle 1 is calculated based on the azimuths of the reference points in step S12.

In step S13, a deviation amount of the traveling course ($\Delta X = Xp - Xn$, $\Delta \theta f$) is calculated, and a steering angle is controlled in step S14 by the steering means 14 in response to the amount of deviation calculated.

In step S15, it is judged whether the moving vehicle 1 is traveling away from the origin (forward direction) or is approaching the origin (reverse direction) in the y-axial direction. In the case of forward direction, it is judged whether one stroke has been finished (Yp>Ye) or not in step S16, while in case of reverse direction, it is judged whether one stroke has been finished (Yp<Yst) or not in step S17. When it is judged that one stroke has not been finished in either step S16 or step S17, the process returns to step S4.

In the case where it is judged that one stroke has been finished in either step S16 or step S17, it is judged in the following step S18 whether all the strokes have been finished (Xp>Xe−L) or not.

If the whole course has not been completed as yet, the process advances to step S19 where the work is stopped by stopping the rotation of the cutter blade for lawn mowing for instance, and the moving vehicle 1 is made to travel along the course 29 according to the predetermined program in step S20.

In the step S20, first, the moving vehicle 1 is allowed to forwardly travel to the turning point (Y-coordinate=Yxf) with the steering angle being fixed in a straight-going state. The feedback control of the steering angle may be performed at this stage as in a straight traveling course. The steering angle is set to a first predetermined angle at the turning point and the moving vehicle is made to reversely (backwardly) travel for a first predetermined time. Then the steering angle is fixed at a second predetermined angle opposite to the first predetermined angle and the moving vehicle is made to further reversely (backwardly) travel for a second predetermined time. By such program control of the steering angle, the moving vehicle 1 is made to reversely travel in the shape of an "S" almost to the work restart position (Y-coordinate=Ye) as shown by dotted lines 29 in FIG. 3. Since, thereafter, the control transfers to the feedback mode in steps S22, S23, and S12 to S14, the work can be resumed along the preset straight traveling course. Instead of the above described control, various steering angles may be preset stepwise as a function of time.

In step S21, it is determined whether or not the program traveling has been completed, and if it has been completed, (Xn+L) is set in Xn for setting the next straight traveling course in step S22.

In step S23, the cutter blade is rotated to resume the work.

On the other hand, if it is determined in step S17 that one course has been completed, a processing similar to the steps S18 to S22 is executed in steps S24 to S28.

If it is determined in step S18 or S24 that the whole course has been completed, the moving vehicle returns to the return position R(Xret, Yret) in step S29 and the traveling is stopped in step S30.

On the other hand, if the count value of the light reception number counter 12 does not match the predetermined number of reference points in the decision in step S8, the process flows to step S31 to clear the light reception number counter 12, and the count value of the missing counter 27 is incremented in step S32.

In step S33, it is determined whether the count value of the missing counter 27 has reached a predetermined threshold value Z, and if it is affirmative an action such as an audible alarm or alarm display is taken in step S34 and the traveling of the moving vehicle 1 is stopped in step S35. If it is negative, the flow returns to step S4.

As described above, in the present embodiment, since the steering control maintains the reference direction of the photosensor mounted on the moving vehicle 1 between the predetermined adjoining two reference points, the missing of a reference point can easily be judged by simply comparing the number of the light signals received during one rotation or scan of the photosensor from the reference direction with the number of the reference points.

In the above described embodiment, the moving vehicle 1 is supposed to be made to backwardly travel along the transfer course 29 in which the traveling direction is reversed without turning the moving vehicle 1 itself while moving vehicle 1 is transferred in a substantially S-shape path to the next straight work course. However, the transfer course for maintaining the reference direction of the photosensor between the predetermined two reference points is not limited to this, and a course as shown in FIG. 5 may be taken.

In the same figure, the moving vehicle 1 is supposed to have a drive system which enables a four-wheel drive. In such a moving vehicle 1, when the Y-coordinate of the moving vehicle 1 reaches Ye or Yst, the moving vehicle 1 is steered in a direction substantially perpendicular to the advance direction or straight traveling course and moved in the direction of X-axis by the distance L for transfer to the next straight work course. Such a transfer method can be effectively applied particularly in the case where a space enough to allow moving vehicle 1 to travel cannot be secured around the work area. In addition, as in the case of FIG. 3, the moving vehicle 1 may of course be moved by the distance L in the direction of the X-axis at the point of coordinate Yxf of Yxb.

Moreover, the present invention can also be applied for various traveling courses without departing from the principal idea of the present invention that the reference direction of the photosensor is maintained between the predetermined adjoining two reference points.

As apparent from the above description, the following effects can be obtained in accordance with the present invention.

(1) It can be determined by simple counting and comparison that a phenomenon such as the missing of one or more reference points, or the reception of a noise or noises, has occurred.

(2) Even if the missing of one or more reference points and the reception of a noise or noises has occurred during one revolution or scan of the photosensor and the number of the received light beams happens to match the number of the previously disposed reference points, the effect of the noise on the steering control can be suppressed because the detected and stored azimuthal data is cleared for each one scan and the position and advance direction of the moving vehicle are calculated on the basis of the newly detected azimuthal data.

What is claimed is:

1. A steering control system for a moving vehicle wherein a photosensor consisting of a light beam scanning means and a light-receiving means integrally rotating with the scanning means is mounted on the moving vehicle, a light beam is scanned around the moving vehicle in the circumferential direction, and the light beams relfected by at least three light reflecting means disposed at reference positions remote from the moving vehicle are received by the light-receiving means in a predetermined order, thereby for detecting a position of the moving vehicle on the basis of the received light beams and allowing the moving vehicle to travel along a predetermined traveling course on the basis of the detected position, the steering control system for the moving vehicle comprising:

means for allowing the moving vehicle to travel so that the reference direction for the light beam scanning by the photosensor is maintained between predetermined adjoining two light reflecting means during forward and backward traveling periods of a work course, means for counting the number of the light beams detected by the photosensor during its one rotation from the reference direction, judging means for comparing the number of the disposed light reflecting means with the number of the detected light beams for each one rotation of the photosensor, and outputting a matching signal if both numbers match each other and outputting a mismatching signal if both numbers mismatch, and means for calculating the position and advance direction of the moving vehicle on the basis of the detected directions of the light beams and the positional information of the reference points in response to the matching signal.

2. A steering control system for a moving vehicle as set forth in claim 1 which further comprises means for fixing the steering angle in response to the mismatching signal.

3. A steering control system for a moving vehicle as set forth in claim 1 wherein the means for allowing the moving vehicle to travel so that the reference direction is maintained between predetermined adjoining two light reflecting means during the forward and backward traveling periods of said work course is a means for making the moving vehicle travel along a transfer course for the moving vehicle to transfer to the start point of an adjoining next straight work course while backwardly traveling after the straight advance by a predetermined distance from the end of a straight work course.

4. A steering control system for a moving vehicle as set forth in claim 2 wherein the means for allowiing the moving vehicle to travel so that the reference direction is maintained between predetermined adjoining two light reflecting means during the forward and backward traveling periods of said work course is a means for making the moving vehicle travel along a transfer course for the moving vehicle to transfer to the start point of an adjoining next straight work course while backwardly traveling after the straigh advance by a predetermined distance from the end of a straight work course.

5. A steering control system for a moving vehicle as set forth in claim 1 wherein the means for allowing the moving vehicle to travel so that the reference direction is the same in the forward and backward travelings is a means for steering the moving vehicle in a substantially perpendicular direction at the end of a straight work course to make the moving vehicle travel along a transfer course for transfer to an adjoining next straight work course.

6. A steering control system for a moving vehicle as set forth in claim 2 wherein the means for allowing the moving vehicle to travel so that the reference direction is the same in the forward and backward travelings is a means for steering the moving vehicle in a substantially prependicular direction at the end of a straight work course to make the moving vehicle travel along a transfer course for transfer to an adjoining next straight work course.

7. A steering control system for a moving vehicle as set forth in claim 1 wherein the means for allowing the moving vehicle to travel so that the reference direction is maintained between perdetermined adjoining two light reflecting means during the forward and backward traveling periods of said work course is a means for steering the moving vehicle through a predetermined pitch distance in a substantially perpendicular direction after the moving vehicle as proceeded over the end of a straight work course by a predetermined distance to make the moving vehicle travel along an adjoining next straight work course.

8. A steering control system for a moving vehicle as set forth in claim 2 wherein the means for allowing the moving vehicle to travel so that the reference direction is maintained between predetermined adjoining two light reflecting means during the forward and backward traveling periods of said work course is a means for steering the moving vehicle through a predetermined pitch distance in a substantially perpendicular direction after the moving vehicle has proceeded over the end of a straight work course by a predetermined distance to make the moving vehicle travel along an adjoining next straight work course.

* * * * *